United States Patent
Spaulding et al.

(10) Patent No.: US 6,470,559 B1
(45) Date of Patent: Oct. 29, 2002

(54) MODULAR AUTOMOTIVE ROOF INSTALLATION METHOD

(75) Inventors: James R. Spaulding, Macomb, MI (US); Olimpia Maria Hernandez, Birmingham, MI (US); Bruce R. Koch, Goodrich, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/911,630

(22) Filed: Jul. 25, 2001

(51) Int. Cl.[7] .............................................. B21D 35/00
(52) U.S. Cl. ...................... 29/469.5; 29/446; 29/451; 29/453; 29/469
(58) Field of Search ...................... 29/446, 450, 451, 29/453, 469, 469.5, 897.2; 296/214

(56) References Cited

U.S. PATENT DOCUMENTS

| | | | | |
|---|---|---|---|---|
| 4,453,303 A | * | 6/1984 | Leddet | 29/407 |
| 4,553,309 A | * | 11/1985 | Hess et al. | 29/450 |
| 4,728,383 A | * | 3/1988 | Kaller et al. | 156/285 |
| 4,731,151 A | * | 3/1988 | Kaller et al. | 156/556 |
| 4,902,068 A | * | 2/1990 | Dowd et al. | 296/214 |
| 5,105,521 A | * | 4/1992 | Dowd et al. | 29/453 |
| 5,269,060 A | * | 12/1993 | Dowd et al. | 29/897.2 |
| 5,688,022 A | * | 11/1997 | Adams et al. | 296/214 |
| 5,795,015 A | * | 8/1998 | Corpe et al. | 296/214 |
| 6,070,902 A | * | 6/2000 | Kowalski et al. | 280/730.2 |
| 6,257,616 B1 | * | 7/2001 | Nowak et al. | 280/730.2 |
| 6,273,499 B1 | * | 8/2001 | Guyon | 296/214 |
| 6,279,978 B1 | * | 8/2001 | Schreyer et al. | 296/39.3 |
| 6,322,136 B2 | * | 11/2001 | Boyce et al. | 296/214 |

* cited by examiner

*Primary Examiner*—David P. Bryant
*Assistant Examiner*—Essama Omgba
(74) *Attorney, Agent, or Firm*—Laura C. Hargitt

(57) ABSTRACT

A method for installing a vehicle roof assembly. A structure is provided defining a roof opening in a vehicle. A headliner is provided having a first configuration larger than the roof opening and a free peripheral edge. Components are installed onto said headliner, and the headliner is secured to a roof panel for forming a roof assembly. The headliner is deformed to a second configuration for displacing the free peripheral edge, and a restraining device maintains the headliner in the second configuration. The roof assembly is installed onto the vehicle through the roof opening. The restraining device is removed and the free peripheral edge is attached to the vehicle for concealing the structure defining the roof opening.

20 Claims, 5 Drawing Sheets

MODULAR AUTOMOTIVE ROOF INSTALLATION METHOD

TECHNICAL FIELD

The present invention relates generally to automotive vehicle assembly techniques, and more particularly to techniques for installing roof assemblies to vehicles.

BACKGROUND OF THE INVENTION

It is known in the manufacture of automotive vehicles to define a roof opening in the vehicle by opposing lateral headers and adjoining laterally spaced roof rails. A stamped metal roof, or molded plastic panel is thereafter seated in the opening and attached to the vehicle with suitable adhesive and fasteners. The interior structural features are concealed with a headliner, which typically is a contoured multi-layer molded construction of fabric, foam, paper, and the like. Headliners are relatively rigid and typically have an outer peripheral edge that is larger in dimension than the roof opening through which it would be desirable to insert the headliner. It is common to mount a plurality of components to a headliner, such as lights, grab bars, mirrors or the like.

It is known to mount automotive roof panels to vehicle frames prior to installation of headliners. The headliner is then brought through a vehicle windshield opening or rear window opening, often necessitating the presence of a person in the vehicle for a substantial portion of the assembly operation.

At least one previous known attempt to facilitate installation of roof assemblies typically has involved steps that, upon installation, leave visible creases, pleats or folds in the headliner.

Thus, it would be desirable to provide an improved method for the installation of automotive roof assemblies in automotive vehicles, particularly one that would enable headliner component installation prior to attachment of a roof panel to a vehicle. It would also be desirable to install a roof assembly by dropping the assembly through a roof opening without interference from the structure defining the roof opening, and in a manner that results in an aesthetically pleasing headliner.

SUMMARY OF THE INVENTION

The needs in the art are met by the method of the present invention, pursuant to which a structure is provided defining a roof opening in a vehicle. A headliner is provided having a first configuration that is larger in dimension than the roof opening and having a free peripheral edge. Many components are installed onto the headliner, and the headliner is secured to a roof panel at a central portion of the headliner for forming a roof assembly. The headliner is deformed to a second configuration for displacing the free peripheral edge, and a restraining device is provided for maintaining the headliner in the second configuration. While maintaining the headliner in the second configuration with the restraining device, the roof assembly is installed onto the vehicle by placement of the headliner through the roof opening. The restraining device is removed and the headliner is permitted to return toward its first configuration. The free peripheral edge is attached to the vehicle for concealing the structure defining the roof opening.

DESCRIPTION OF THE PREFERRED EMBODIMENT

Figure 1:
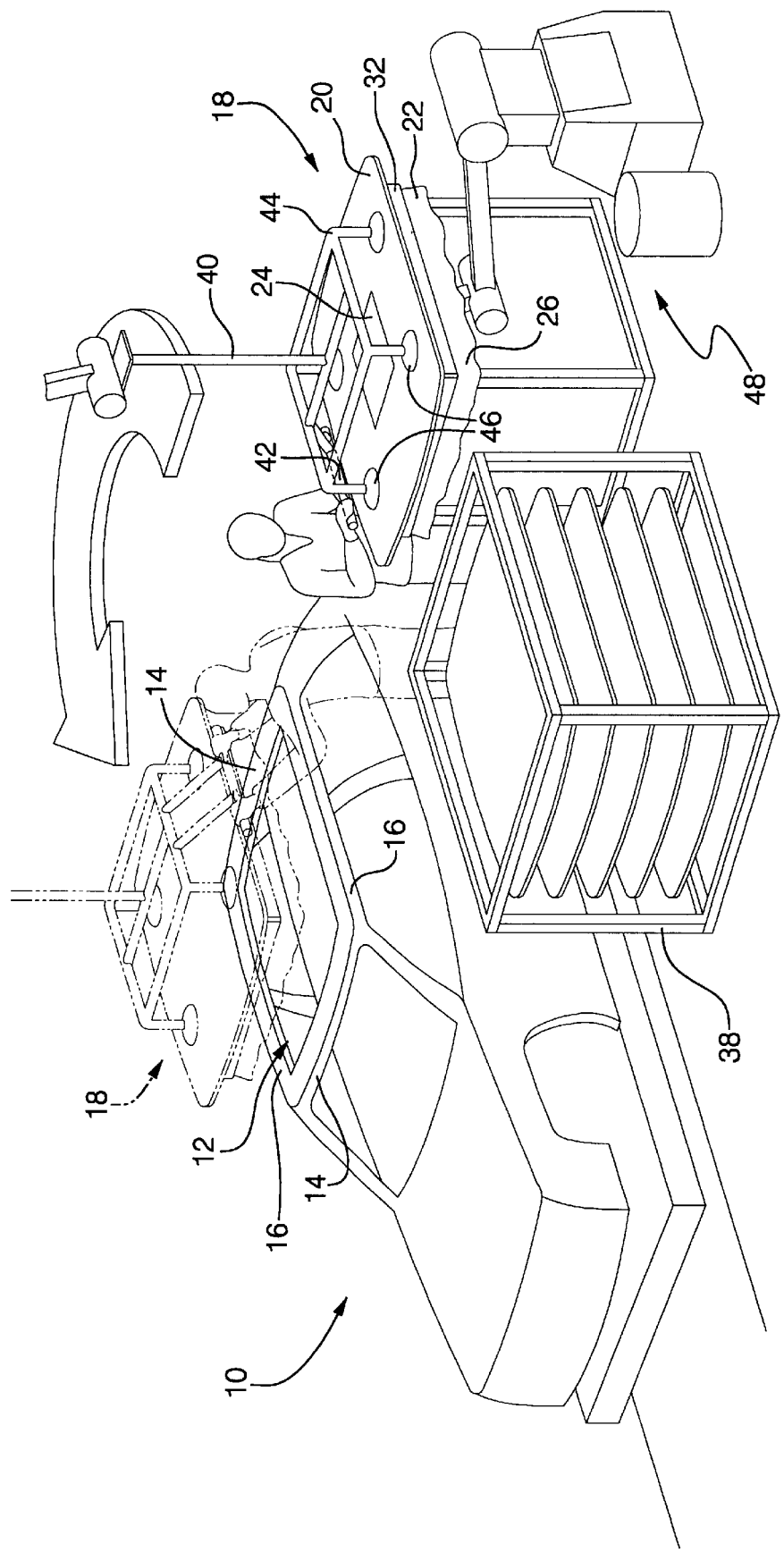
FIG. 1 is a perspective view of a method of installing a roof assembly.
Figure 2:
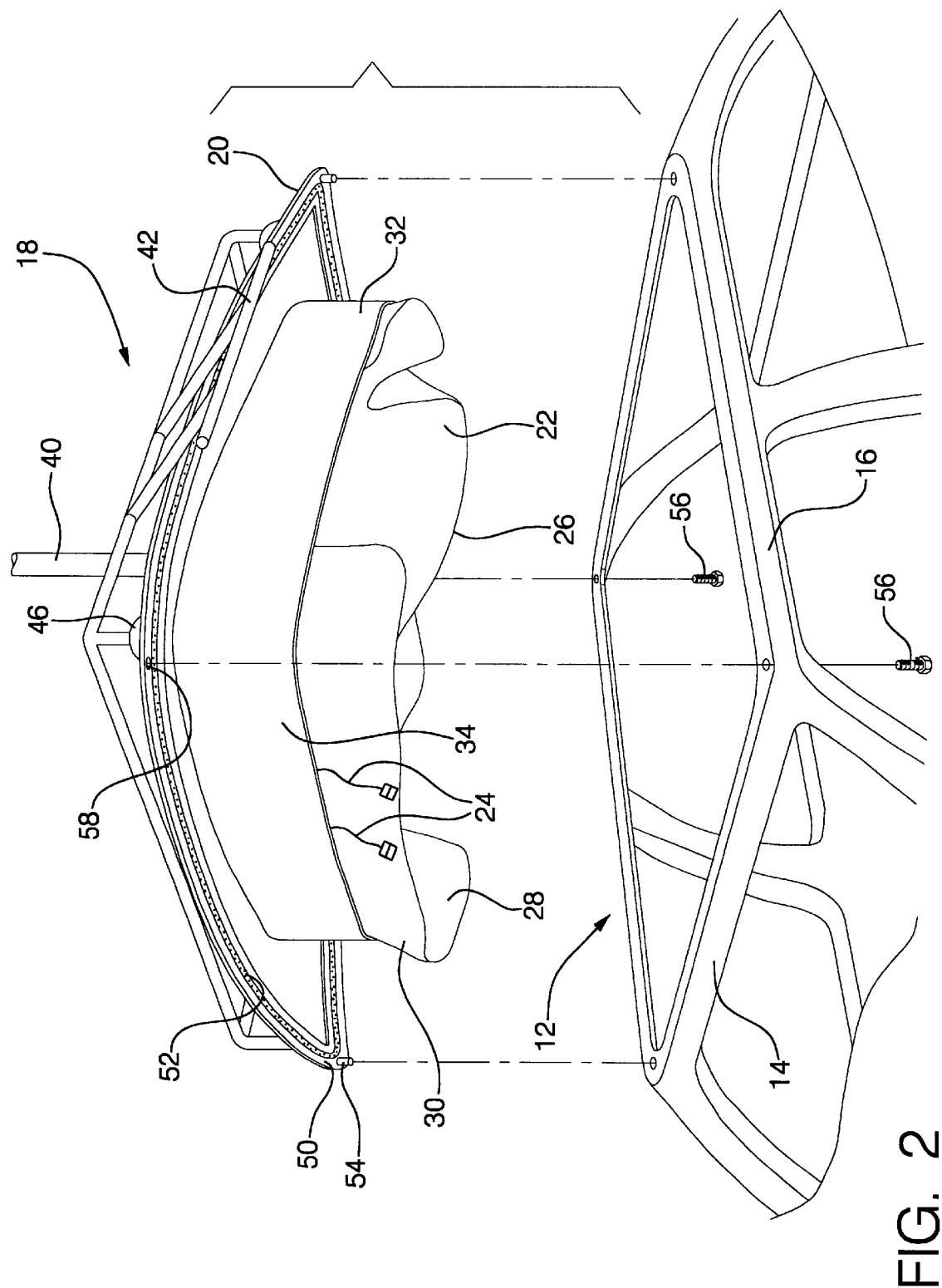
FIG. 2 is a perspective view of the roof assembly before installation.

Referring to the drawings, FIG. 1 illustrates a method for assembling a roof portion of a vehicle 10 that, during assembly, has a roof opening 12 defined by a structure including opposing header members 14 and laterally spaced side rails 16. In accordance with the invention, a roof assembly 18 is secured to the vehicle 10 by placement through the roof opening 12. As shown in FIG. 2, the roof assembly includes a roof panel 20 and a multi-layer laminate headliner 22, which is attached to the roof panel 20, and which includes associated components 24 (electrical connectors shown).

Figure 4:
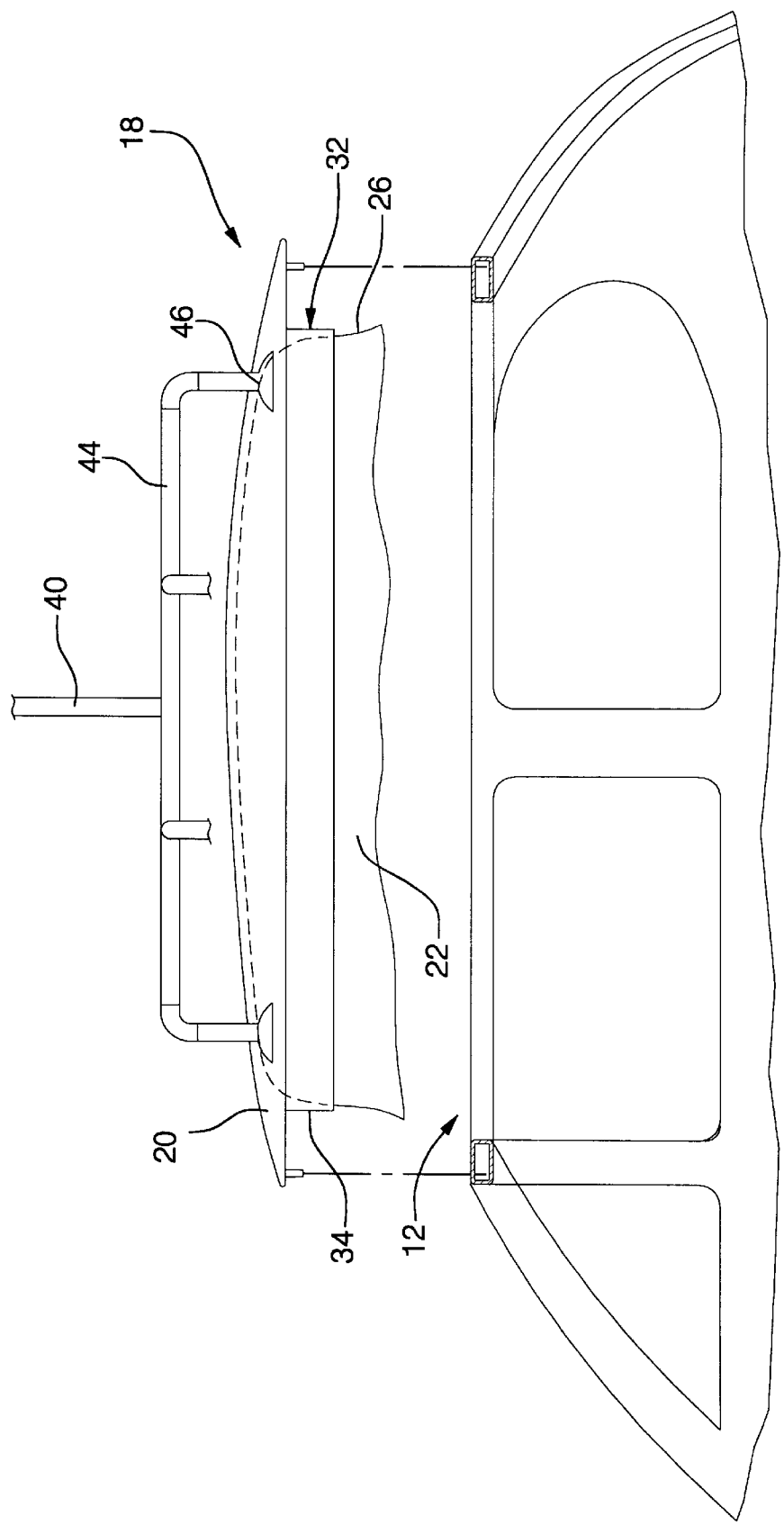
FIG. 4 is a cross-sectional view of an automotive vehicle roof structure and roof assembly.
Figure 5:
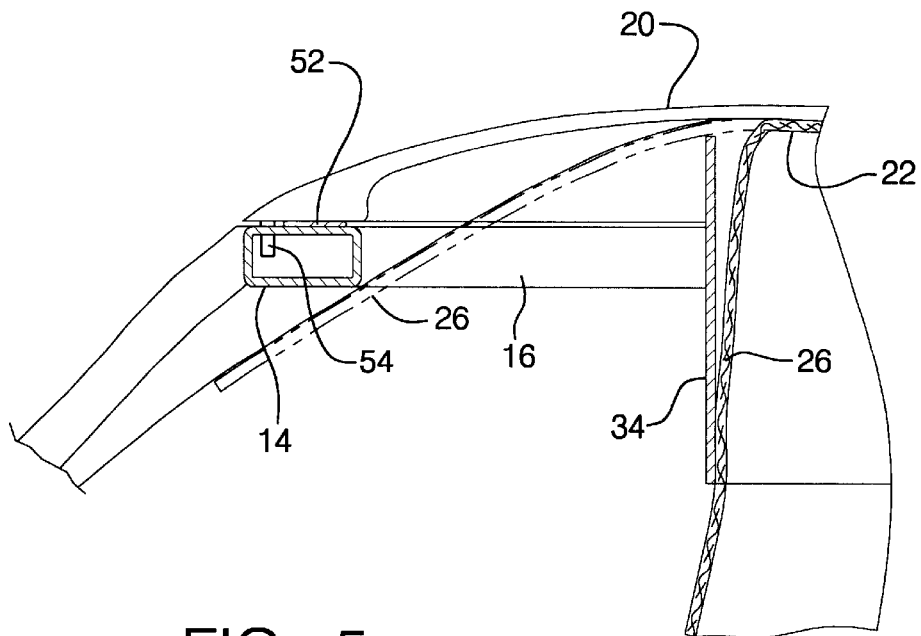
FIG. 5 is a cross-sectional view of the roof assembly and vehicle structure.

The headliner 22 and components 24 are assembled to form the roof assembly 18 at a component assembly site (not shown), such as the site of a vehicle component supplier. The headliner 22 is secured preferably by adhesive at a central portion of the headliner 22 to the roof panel 20, providing a displaceable free peripheral edge 26 relative to the roof panel 20, as is shown in FIGS. 2, 4 and 5. The headliner 22 has a first surface 28 and a second surface 30.

Figure 3:
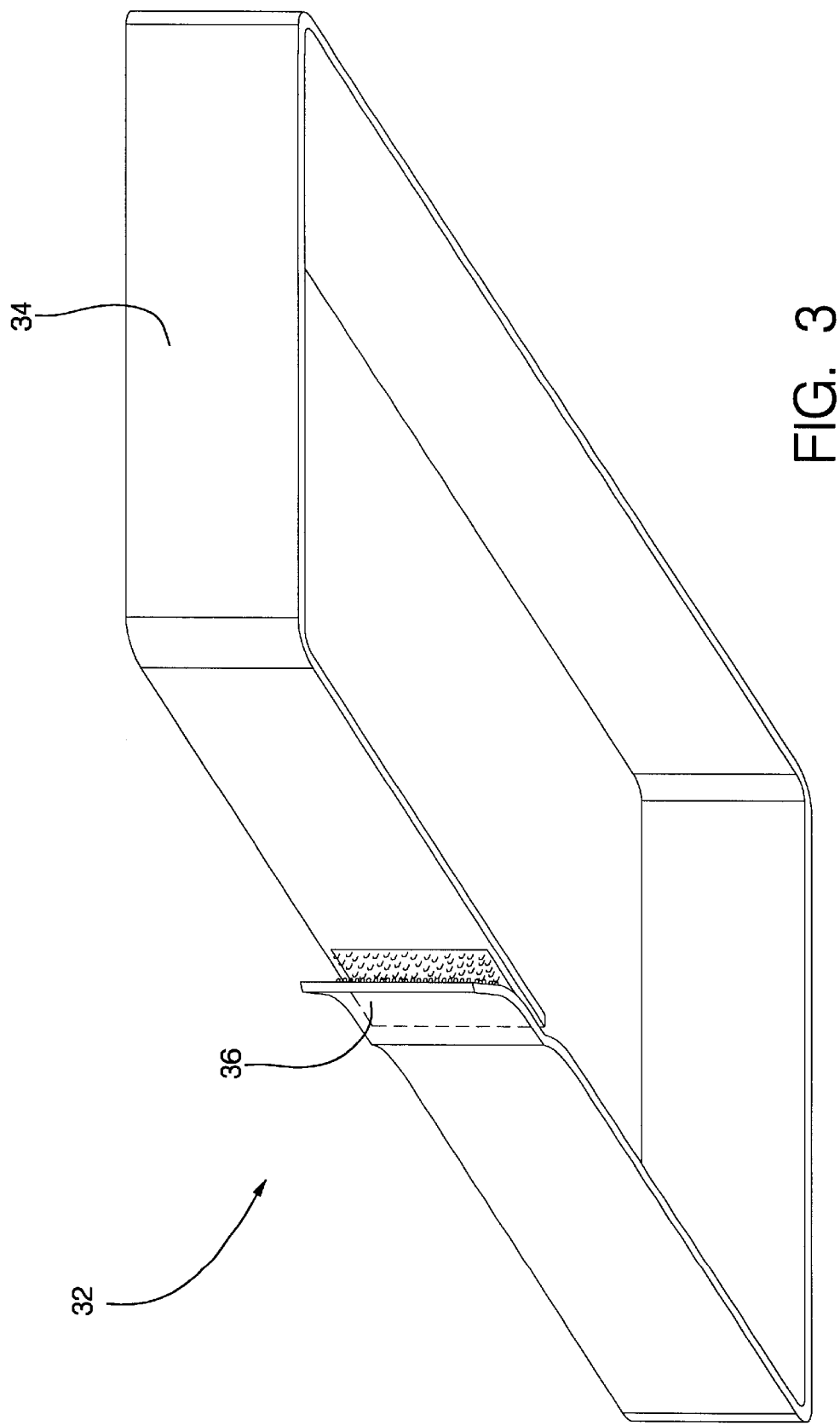
FIG. 3 is a perspective view of a restraining device.

Referring again to FIGS. 2, 3 and 4, a restraining device 32 is used to install a roof assembly 18. The restraining device 32 includes a rigid frame 34 sized to fit within the roof opening 12 substantially free of interference from the vehicle structure defining the roof opening 12, while maintaining the headliner 22 in a deformed second configuration, by placing the first surface 28 in compression and the second surface 30 in tension. FIG. 3 illustrates one example of a restraining device 32, which includes a hook and loop fastener device 36 for opening the restraining device 32 and placing it around the headliner 22. As shown in FIG. 2, the headliner 22 is bent or otherwise deformed to the second configuration. The restraining device 32 is placed around the headliner 22 in contact with the second surface 30 and closed to maintain the second configuration. The assembly 18 then is placed in a shelf-containing storage rack 38, and transported for assembly to the vehicle 10 at a vehicle assembly site, as shown generally in FIG. 1.

As further illustrated in FIGS. 1, 2 and 4, during installation, a moveable transport arm 40 is employed to help guide and position the roof assembly 18 relative to the automotive vehicle 10. Illustrated in phantom is an example of one root assembly 18 being moved between a storage rack 38 and a vehicle 10. The movable transport arm 40 is controlled by using guide handles 42, which are associated with a transport frame 44. The transport frame 44 has suction cups 46 having a surface for releasably and grippingly engaging a surface of the roof panel 20.

The roof assembly 18 is removed from a shelf in the storage rack using the transport arm 40 and then transferred to an adhesive station 48 along the assembly line. The forces applied by the restraining device 32 to the headliner 22 induces or maintains a spacing between the peripheral free edge 26 of the headliner 22 and an underside 50 of the roof panel 20, as shown in FIG. 2. As a result, a suitable adhesive 52 (e.g., a pumpable urethane adhesive) can be applied directly to the underside 50.

As illustrated in FIGS. 1 and 2, the roof assembly 18 is moved to the vehicle frame 10 and positioned over the roof opening 12 of the vehicle 10. It is then seated with the help of a guide-pin locator 54. After seating the roof assembly 18 on the vehicle 10, the roof assembly 18 is secured to the vehicle 10, using the adhesive previously applied, along with fasteners 56 that can be secured to mounting holes 58 associated with the roof panel 20.

After the headliner 22 is inserted through the roof frame opening 12, the restraining device 32 is removed, and the free edge 26 is allowed to spring back or otherwise return toward its first configuration. For applications in which the headliner has been installed while it is elastically maintained in its second configuration, the resulting headliner will exhibit an aestheically pleasing appearance, which is substantially free of folds, creases, pleats or other plastic deformation from the installation process.

The free edge 26 can then be positioned to cover the structural members that have defined the roof opening, illustrated in phantom in FIG. 5, and then further secured to the vehicle as desired.

As can be seen from the above, the present invention may be employed to facilitate assembly of a variety of vehicle types including but not limited to passenger automobiles (e.g. sedans or coupes), sport utility vehicles, station wagons, pickup trucks, vans, minivans, trucks or the like. Moreover, the roof panels may be a single unitary structure or may comprise a plurality of panels (in which case one or more additional restraining members may be employed).

Additional manufacturing flexibility is afforded as components can be readily installed onto a headliner prior to shipping to the vehicle assembly site, including components such as, without limitation, airducts, switches, lights, wires and harnesses, grab bars, grab straps, hangers, consoles, infotainment centers, audio components, antennae, navigation systems, display panels, compasses, thermometers, mirrors or combinations thereof.

The skilled artisan will also appreciate that the present invention may be readily adapted for installing assemblies including a sun roof, moon roof, or other retractable or removable panel.

The roof panel advantageously may be made of any of a variety of materials such as metals (e.g., aluminum or steel), plastics, or composites (e.g. including a glass or carbon fiber material). Integrated systems that further include trim, moldings, ribs, rain ditches, luggage racks, or the like may also be facilitated by the present invention.

Moreover, while the present invention has been disclosed to have a component assembly site remote from the vehicle assembly site, they can be at the same location. Likewise, assembly of the headliner to the roof panel may occur at the vehicle assembly site, before or after the restraining device is used.

Figure 6:
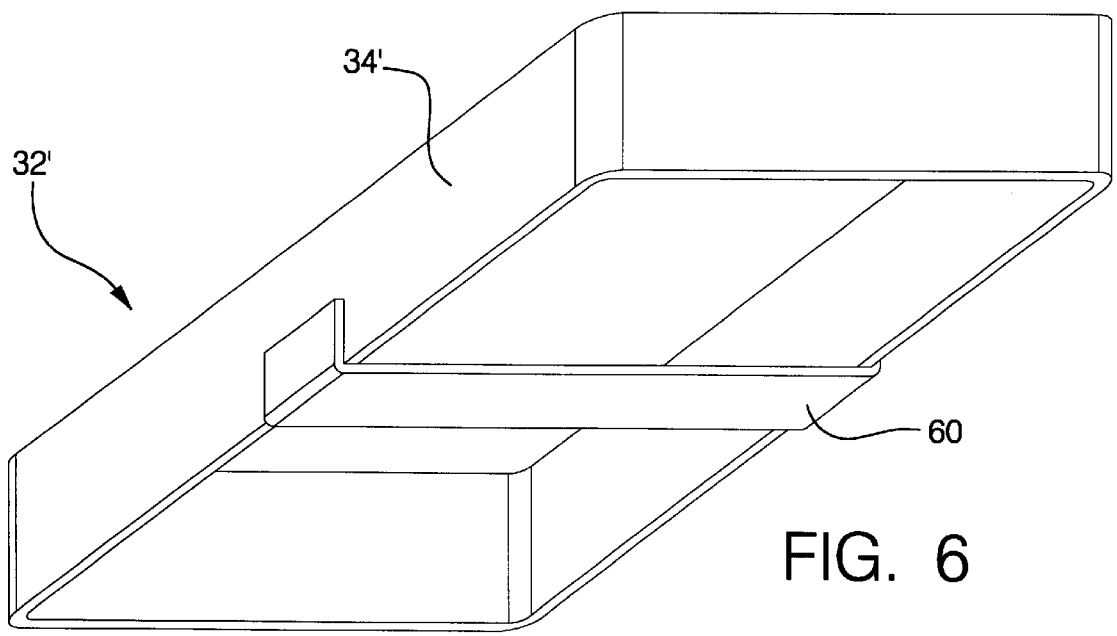
FIG. 6 is perspective view of another preferred restraining member.

Further, the restraining device need not be limited to the embodiment disclosed. For instance, in another embodiment, illustrated in FIG. 6, an alternative restraining device 32' may include a frame 34' reinforcing cross member 60 to increase the dimensional stability of the overall device.

A securing system other than a hook and loop fastener may be employed. Moreover, the restraining device could be an adjustable, or a resilient structure, such as a large rubber band. It may also be a plastic film that is shrink-wrapped about the headliner to alter the configuration of the headliner during installation. Thus, it will be appreciated that the headliner can be bent to its second configuration prior to or as a result of the placement of the restraining device about it. In addition, it will be appreciated that the present invention also contemplates instances where the restraining device is employed for a headliner that is plastically deformed during the installation process.

The foregoing detailed description provides preferred exemplary embodiments only. Various modifications may be made without departing from the spirit and scope of the invention as set forth in the appended claims.

What is claimed is:

1. A method for assembly of a vehicle roof assembly into a vehicle, comprising the steps of:
    a) providing a structure defining a roof opening in a vehicle;
    b) providing a headliner having a first configuration that is larger in dimension than said roof opening and a free peripheral edge;
    c) installing a plurality of components into said headliner;
    d) securing said headliner to a roof panel at a central portion of said headliner for forming a roof assembly;
    e) deforming said headliner to a second configuration for displacing said free peripheral edge;
    f) providing a restraining device for maintaining said headliner in said second configuration;
    g) maintaining said headliner in said second configuration with said restraining device;
    h) installing said roof assembly onto said vehicle by placement of said headliner through said roof opening;
    i) removing said restraining device and permitting said headliner to return toward said first configuration; and
    j) attaching said free peripheral edge to said vehicle for concealing said structure defining said roof opening.

2. The method of claim 1, wherein the headliner is substantially free of plastic deformation from said maintaining step (g).

3. The method of claim 1, wherein said components are selected from airducts, switches, lights, wires and harnesses, grab bars, grab straps, hangers, consoles, infotainment centers, audio components, antennae, navigation systems, display panels, compasses, thermometers, mirrors or combinations thereof.

4. The method of claim 1 wherein said securing step (d) is performed with an adhesive.

5. The method of claim 1 further comprising attaching said roof panel to said structure defining said roof opening with an adhesive.

6. The method of claim 5 further comprising attaching said roof panel with a plurality of fasteners.

7. A method for assembly of a vehicle roof assembly into a vehicle, comprising the steps of:
    a) providing a structure defining a roof opening in a vehicle;
    b) providing a multi-layer laminate headliner having a first configuration that is larger in dimension than said roof opening and a free peripheral edge;
    c) installing a plurality of components into said headliner;
    d) securing said headliner to a roof panel at a central portion of said headliner for forming a roof assembly;
    e) elastically deforming said headliner to a second configuration for displacing said free peripheral edge;
    f) applying an adhesive to said roof panel;

g) providing a restraining device for maintaining said headliner in said elastically deformed second configuration;

h) maintaining said headliner in said second elastically deformed configuration with said restraining device;

i) installing said roof assembly onto said vehicle by placement of said headliner through said roof opening so that said adhesive on said roof panel joins said roof panel to said structure defining said roof opening;

j) removing said restraining device and permitting said headliner to return toward said first configuration substantially free of plastic deformation from said maintaining step (h); and k) attaching said free peripheral edge to said vehicle for concealing said structure defining said root opening.

8. The method of claim 7, wherein said installing step (i) includes fastening said panel to said structure defining said roof opening with a plurality of fasteners.

9. The method of claim 7 wherein said restraining device includes a rigid frame and a fastener for opening and closing said frame.

10. The method of claim 9, wherein said restraining device further includes a reinforcing cross member.

11. The method of claim 7, wherein said restraining device is a resilient band.

12. The method of claim 7, wherein said providing step (g) includes shrink-fitting a film about said headliner.

13. A method for assembly of a vehicle roof assembly into a vehicle, comprising the steps of:

a) providing a structure defining a roof opening in a vehicle;

b) providing a headliner having a first configuration that is larger in dimension than said roof opening and a free peripheral edge;

c) installing a plurality of components into said headliner;

d) securing said headliner to a roof panel at a central portion of said headliner for forming a roof assembly;

e) deforming said headliner to a second configuration for displacing said free peripheral edge;

f) providing a restraining device for maintaining said headliner in said second configuration;

g) maintaining said headliner in said second configuration with said restraining device;

h) placing said headliner and restraining device into a storage rack for receiving a plurality of headliners;

i) removing said headliner from said storage rack;

j) securing said headliner to a roof panel at a central portion of said headliner for forming a roof assembly;

k) installing said roof assembly onto said vehicle by placement of said headliner through said roof opening; and l) removing said restraining device and permitting said headliner to return toward said first configuration.

14. The method of claim 13, wherein said storage rack includes a plurality of shelves for receiving said headliners.

15. The method of claim 13, wherein said securing step (j) occurs prior to said placing step (h).

16. The method of claim 13, wherein said securing step (k) occurs after said placing step (h).

17. The method of claim 15, wherein a transport arm associated with a frame having gripping engagement surfaces is employed for removing said headliner from said storage rack.

18. The method of claim 13, wherein plastic deformation occurs during said deforming step (e).

19. The method of claim 13, wherein said deforming step (e) results in said headliner substantially free of plastic deformation.

20. The method of claim 13, further comprising the step of: (m) attaching said free peripheral edge to said vehicle for concealing said structure defining said roof opening.

* * * * *